Oct. 14, 1969  R. L. WILLIAMS  3,472,480
FLOW CONTROL VALVE
Original Filed Feb. 27, 1964
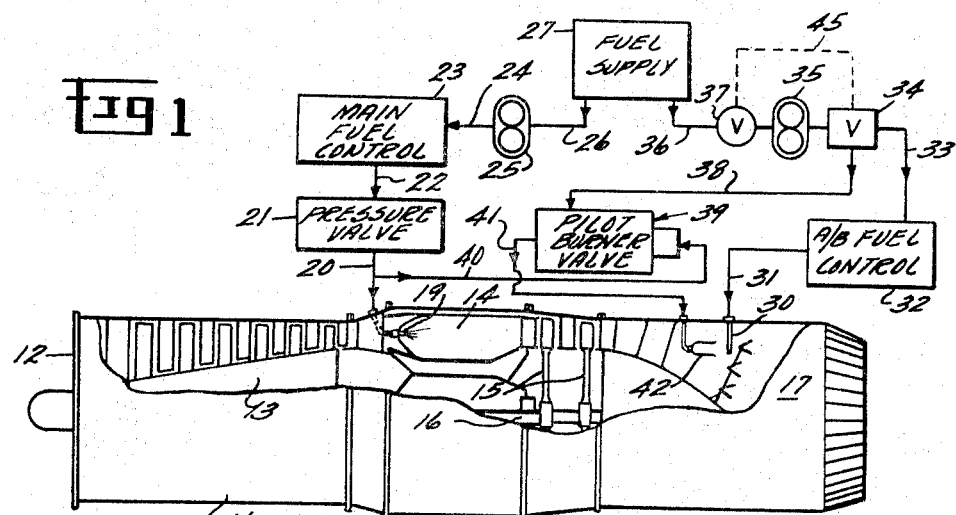
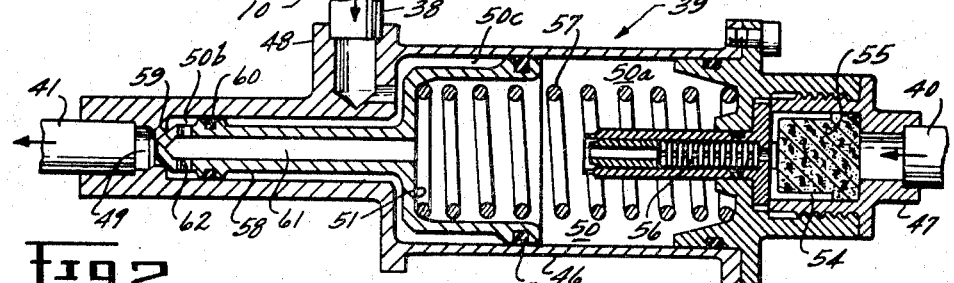
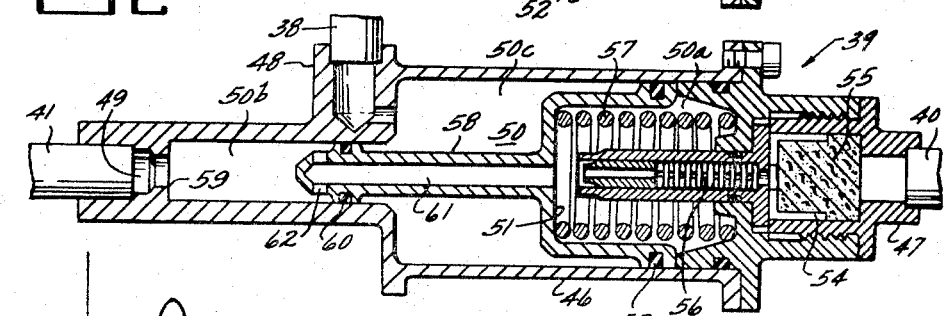
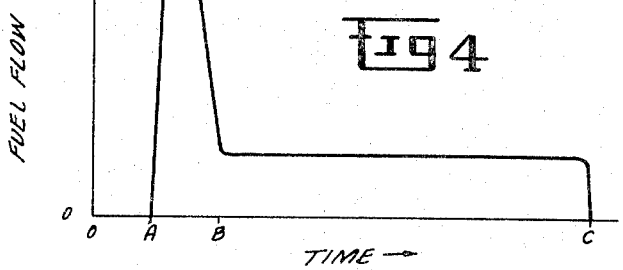
INVENTOR.
RAYMOND L. WILLIAMS
BY
ATTORNEY United States Patent Office 3,472,480
Patented Oct. 14, 1969

3,472,480
FLOW CONTROL VALVE
Raymond L. Williams, Cincinnati, Ohio, assignor to General Electric Company, a corporation of New York
Original application Feb. 27, 1964, Ser. No. 347,818, now Patent No. 3,270,500. Divided and this application Feb. 23, 1966, Ser. No. 529,530
Int. Cl. F16k 31/143, 31/363, 15/18
U.S. Cl. 251—63                                  4 Claims

ABSTRACT OF THE DISCLOSURE

The disclosure illustrates a fuel control system for a gas turbine engine. The disclosure also shows a fuel control valve comprising a cylinder having an inlet at one end and an outlet at the opposite end. A hollow piston is reciprocal in this cylinder. The piston has an extension which in one position seals the outlet from the cylinder. Means are provided for pressurizing one end of the cylinder to displace the piston from its outlet sealing position to provide flow through passageways in the piston extension and flow from the inlet to the outlet. Restrictive orifices are provided in the inlet so that upon initial displacement of the piston, which is hollow, there is a relatively large flow through the outlet which is automatically reduced to a lesser flow.

---

The present application is a divisional application of copending application Ser. No. 347,818, filed Feb. 27, 1964 now Patent No. 3,270,500.

This invention relates to an improved flow control valve having particular utility in an afterburner fuel control system for optimum operation of the afterburner.

In turbojet powered aircraft, afterburner or reheat systems are frequently employed for increased thrust operation incorporating a fuel system for injecting fuel into the turbojet exhaust stream which in burning, reheats the exhaust stream and increases the output thrust of the turbojet. This afterburner fuel control must assure immediate ignition of the fuel injected into the exhaust stream and for this purpose a pilot burner is provided; however, for reasons of fuel economy and maintenance it is beneficial if this pilot burner is ignited only during afterburner operation. This invention is directed to afterburner control system incorporating a valve in the pilot burner supply which assures that the pilot burner is ignited when fuel is being supplied to the afterburner nozzles yet limits fuel input to the pilot burner only to that time when fuel is being fed to the afterburner nozzles.

It is therefore one object of this invention to provide an improved afterburner fuel control incorporating a pilot burner fuel valve which allows the passage of fuel to the pilot burner only during operation of the afterburner and which assures ignition of the pilot burner when fuel reaches the main afterburner fuel nozzles.

It is another object of this invention to provide a valve utilizing a cylinder and piston assembly whereby upon actuation of the valve the fluid within the cylinder is ejected from the valve by actuation of the piston to provide an immediate supply of fluid to a fluid system.

It is another object of this invention to provide an afterburner pilot burner system incorporating a valve in the fuel supply line having a cylinder and piston assembly with a reservoir of fluid stored in the cylinder whereby upon actuation of the piston the ports leading to the fluid outlet of the valve are opened immediately to pass the stored fluid within the valve through the outlet port and into the fuel supply line for an immediate supply of fluid to the pilot burner.

In carrying out these and other objects of this invention one embodiment of the invention incorporates a valve in the afterburner pilot burner fuel supply system for controlling the supply of the fuel to the afterburner pilot burner for optimum performance of the pilot burner system. This valve, upon initial fuel flow to the afterburner nozzles, is actuated to allow fuel flow to the pilot burner to ensure ignition of the pilot burner for positive ignition of the afterburner fuel. The valve incorporates a piston and cylinder assembly with a reservoir of fuel stored in the cylinder whereby upon actuation this quantity of fuel is injected into the pilot burner fuel line to fill or charge this line and immediately supply fuel to the pilot burner at the time of fuel reaching the afterburner nozzles for ignition of the pilot burner and subsequent ignition of the afterburner.

Other objects and many of the attendant advantages of this invention will be readily appreciated as the same becomes better understood by reference to the following detailed description when considered in connection with the accompanying drawing wherein:

FIGURE 1 illustrates a turbojet engine partially in cross section with the fuel system illustrated schematically;

FIGURE 2 shows the pilot burner valve in cross section in the closed position;

FIGURE 3 shows the pilot burner valve in cross section in an open position; and

FIGURE 4 illustrates graphically against time the supply of fuel supplied to the pilot burner fuel line.

Referring to FIGURE 1, a turbojet engine 10 is illustrated generally comprising a casing 11, an inlet 12, a compressor section 13, a main combustor 14, a turbine 15 connected by shaft 16 to the compressor, and an exhaust nozzle 17. Fuel nozzles 19 are provided within the main combustor 14 with a conduit 20 leading thereto from a pressurizing valve 21 which is connected by a fuel line 22 to a main fuel control 23. Fuel is supplied to the fuel nozzles 19 of the main combustor 14 through conduit 24, pump 25 and fuel line 26 from a fuel supply 27, the quantity being regulated by the main fuel control 23.

The afterburner or reheat section of the turbojet comprises fuel nozzles 30 positioned within the exhaust nozzle 17 of the turbojet with a fuel line 31 leading from the afterburner fuel control 32 which is supplied with fuel through the fuel line 33 and a control valve 34 by action of an afterburner pump 35 receiving fuel from the fuel supply 27 through the fuel line 36 and valve 37. A fuel pressure line 38 also leads from the valve 34 to a pilot burner valve 39 while a fuel supply line 40 leads to the pilot burner valve 39 from the main fuel line 20. From the pilot burner valve 39 a fuel line 41 conducts fuel to the pilot burner 42 positioned within the exhaust nozzle of the turbojet. As indicated by the dotted line 45 the actuation of valve 37 and valve 34 are tied together and upon actuation of the two position valve 34, valve 34 allows pressured fuel from the pump 35 to pass through lines 33 and 38, while in the other position valve 34 vents the pump 35 and the line 38 to atmosphere and valve 37 shuts off the supply of fuel to the pump. The internal structures of these valves are not illustrated, however there are many known types suitable for performing the function described.

To explain the operation of this fuel system, under normal operating conditions fuel is supplied from the fuel supply 27 through the main fuel control 23 to the main combustor fuel nozzles 19 within the main combustor 14 for operation of the turbojet in the normal thrust ranges. When afterburning operation is required, valves 37 and 34 are actuated from the position venting the line 38 and 45 to atmosphere to the position whereby fuel is supplied from the fuel supply 27 through the pump 35 and to the lines 33 and 38. The pressured fuel within the line 38 causes the pilot burner valve 39 to be actuated as will be explained later to allow fuel from the fuel line 40 to pass through the fuel line 41 to the pilot burner 42 where it is ignited by a suitable means such as a spark discharge device (not shown). Also, the fuel supplied through the line 33 passes through the afterburner fuel control 32 and the fuel line 31 to the main afterburner fuel nozzles 30 where it is ignited by the already ignited fuel supplied to the pilot fuel nozzle 42 for operation of the turbojet. It may be seen that fuel is supplied to the pilot burner nozzle 42 only when the afterburner is in actual operation, however it is important that the supply of fuel to the pilot burner be immediate so that the pilot burner is ignited when fuel is supplied to the afterburner fuel nozzles 30 for proper ignition of the afterburner.

Referring now to FIGURES 2 and 3, the pilot burner valve 39 is illustrated in enlarged cross section with the attached fuel lines 38, 40 and 41 partially illustrated. The valve itself comprises a housing 46 having an inlet 47 to which is attached the fuel line 40, inlet 48 to which is attached the fuel line 38 and an outlet 49 to which is attached the fuel line 41 leading to the pilot burner 42. The housing 46 forms an internal elongated cavity 50 in which a piston 51 is positioned to slide longitudinally within the cavity 50 and with the seal 52, divides the cavity into two separate compartments. Compartment 50a connects with the inlet 47 by a passage 54 in which is positioned a filter 55 and an orifice pack 56. The purpose of the filter obviously is to prevent contamination of the valve by any foreign matter carried in the fuel passing from the fuel line 40, and the purpose of the orifice pack 56 is to reduce the flow of the fuel supplied into the compartment 50a since lower fuel flow than that supplied to the main combustor is necessary for proper operation of the pilot burner. A spring 57 serves to bias the piston 51 into the position illustrated in FIGURE 2 and while in this position, fuel from fuel line 40 may pass into the cavity 50a and fill the cavity. An extension 58 of the piston 51 extends toward the valve port 59 and includes a passage 61 through which fluid may flow from compartment 50a with holes 62 in this extension leading into the compartment 50b. The extension 58 is shaped to close the outlet 49 and prevent fluid flow from passing from the compartment 50b through the outlet 49 and into the fuel line 41 while in the position illustrated in FIGURE 2. Connecting with the inlet 48 is a third compartment 50c within the valve cavity 50 with this compartment formed by the piston 51 in conjunction with the seals 52 and 60 extending between the piston and housing. Naturally pressured fluid supplied through the fuel line 38 will act on the piston to surge it to the position illustrated in FIGURE 3 since this fluid pressure is greater than the pressure of the fluid in compartment 50a due to pressure drops in the afterburner fuel control 32.

To explain the operation of the valve when fluid flows through line 38 into the valve the force of the fluid acting on piston 51 is sufficient to overcome the biasing force of the fluid within the compartment 50a and the force of the spring 57 acting on the piston, therefore the piston 51 will be surged towards that position illustrated in FIGURE 3 thereby causing the extension 58 to move away from the valve port 59 further effecting the expulsion of fluid from the compartment 50a out through the passage 61, the holes 62 and the fluid outlet 49 for passage through the line 41. The fluid will be expelled in this direction since this fluid path offers much lower resistance to fluid flow than the path back through the orifice pack 56. The flow of fluid from compartment 50a may also serve to decrease the fluid pressure within the compartment thereby decreasing the fluid force on the piston resulting from that fluid pressure to allow the piston to more easily move to the position illustrated in FIGURE 3. Movement of the piston 51 to the position illustrated in FIGURE 3 thereafter allows fluid flow through the valve by passage from the fuel supply line 40, through the orifice pack 56, the compartment 50a, the passage 61, the holes 62 and the outlet 49 into the fuel line 41. The pressure of this fluid will be reduced by passage through the orifice pack 56 for the purposes earlier explained. Also fluid from pressure line 38 will remain static in compartment 50c since this is a sealed compartment. Fuel flow from fuel line 40 through the valve and through the fuel line 41 will continue so long as the fuel pressure is maintained in the line 38 and compartment 50c.

To explain the operation of the afterburner fuel control with the valve 39, when afterburner operation is signaled by actuation of valves 37 and 34, the actuation of which is generally effected through the main fuel control, pressured fuel is supplied through the line 38 to pass into the compartment 50c. This pressured fuel is of sufficient pressure to cause the fuel piston to move to the right to the position illustrated in FIGURE 3 as explained heretofore. The movement of the piston 51 accomplishes two purposes, namely, to allow fluid flow through the valve port 59 by movement of the extension 58 away from the valve seat with further movement of the piston 51 causing an immediate expulsion of the fluid fuel from the compartment 50a through the passage 61, holes 62 and the fluid outlet 49 into the fuel line 41. By this action of the valve an immediate charge of fuel fills the fuel line 41 which normally is evacuated as explained heretofore by reason of the drainage of fuel from the fuel line 41 due to both its configuration and to vaporization of fuel due to exposure to the high temperature exhaust gas stream of the turbojet. However, since the pilot burner valve 39 closes when valve 34 closes, fuel remains in the compartment 50a of valve 39.

FIGURE 4 is provided to illustrate graphically against time the flow of fuel through the fuel line 41 as supplied through the outlet 49 of the pilot burner valve 39. Illustrated here is a graph with time as the horizontal axis and quantity of fuel flow from the valve as the vertical axis. Under normal operation from zero to point A on the horizontal axis no fuel flow passes through the outlet 49 of the pilot burner valve since the valves 37 and 34 are positioned to prevent fuel flow through the fuel lines 33 and 38. However, at point A actuation of the afterburner system is signaled causing actuation of the valves 37 and 34 to allow fuel flow through the lines 33 and 38 with flow from line 38 entering the compartment 50c of the valve to cause a rapid actuation of the piston 51 to the position illustrated in FIGURE 3, at which time the quantity of fuel within the compartment 50a is forced through the passage 61 of the extension 58, through the holes 62 and out through the outlet 49 and into the fuel line 41 as illustrated from point A to point B on the graph to be an immediate high quantity charge of fluid.

Subsequent to this high quality flow through line 41, fuel may pass from the fuel line 40 through the valve and out through the fuel line 41 as previously described and as illustrated from point B to point C on the graph. From that time on, normal operation of the afterburner pilot burner requires only that this lesser amount of fuel be supplied to the pilot burner 42. Meanwhile fuel flow through fuel line 33 has passed through the afterburner fuel control 32 and the fuel line 31 to the afterburner main fuel nozzles 30. Due to the immediate charging of the fuel line 41, however, the fuel flow to the pilot burner has already occurred, enabling ignition of the pilot burner for immediate ignition of the main afterburner fuel flow through fuel line 31 as soon as it reaches the afterburner fuel nozzles 30. At point C the afterburner is shut off allowing the venting of line 38 to atmosphere through actuation of valve 34 causing the movement of the piston under the fluid pressure within the compartment 50a and the spring 57 to move to that position illustrated in FIGURE 2 closing off fluid flow through the outlet 49 by closing the valve port 59 by the extension 58 of the piston. Therefore, the pilot burner is in operation only during afterburner operation, thereby effecting a savings in fuel and operation of the system.

While a particular embodiment of the invention has been illustrated and described, it will be obvious to those skilled in the art that various changes and modifications may be made without departing from the fundamental theme of the invention.

Having thus described the invention, what is claimed as novel and desired to be secured by Letters Patent of the United States is:

1. A flow control valve comprising:
   a housing having an inlet for connection with a first source of pressurized fluid and an outlet;
   a piston disposed within said housing for movement between a first position and a second position;
   said piston adapted to form, in cooperation with said housing, a compartment on one side of said piston communicating with said inlet;
   passage means, at least in part, through said piston for delivery of fluid from said compartment and said inlet to said outlet, said passage means being of smaller cross-sectional area than said compartment;
   said inlet being restricted as compared with said outlet and said passage means;
   means for preventing fluid flow through said outlet when said piston is in said first position and for allowing such flow when said piston is out of said first position;
   means for moving said piston from said first position toward said second position whereby flow from said outlet is established which is characterized by an initial surge of fluid.

2. The flow control valve of claim 1 further characterized by and including an extension from said piston of smaller cross-sectional area than said piston, and a bore in said housing for receiving said extension, said passage means including a passageway through said piston and said extension and at least a portion of said bore.

3. The flow control valve of claim 2 further characterized in that said moving means comprise means for introducing fluid of a greater pressure than said first pressurized fluid into said housing intermediate said compartment and the portion of said bore defining said passage means.

4. The flow control valve of claim 2 wherein said housing includes a valve seat intermediate said bore and said outlet the end of said extension adapted to seat in said valve port to prevent fluid flow therethrough when said piston is in said first position and move out of seated engagement with said valve port when said piston is moved toward said second position.

References Cited

UNITED STATES PATENTS

| 1,490,227 | 4/1924 | Osborn | 137—625.26 |
| 1,709,151 | 4/1929 | Podszus. | |

FOREIGN PATENTS 1,110,137  10/1955  France.

M. CARY NELSON, Primary Examiner

WILLIAM R. CLINE, Assistant Examiner